(12) United States Patent
Becker et al.

(10) Patent No.: US 7,717,508 B2
(45) Date of Patent: May 18, 2010

(54) HEADREST WITH CARRIER STRUCTURE AND SUPPORTING MEMBER

(75) Inventors: Burckhard Becker, Solingen (DE); Rolf Steinmetz, Düsseldorf (DE); Thomas Thiel, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 141 days.

(21) Appl. No.: 11/386,355

(22) Filed: Mar. 22, 2006

(65) Prior Publication Data

US 2006/0250001 A1 Nov. 9, 2006

(30) Foreign Application Priority Data

Mar. 23, 2005 (DE) .................. 10 2005 014 038

(51) Int. Cl.
*B60N 2/42* (2006.01)
(52) U.S. Cl. ................ 297/216.12; 297/216.1; 297/406; 297/409
(58) Field of Classification Search ............ 297/216.12, 297/406, 409, 391, 216.1
See application file for complete search history.

(56) References Cited

U.S. PATENT DOCUMENTS 6,688,697 B2 * 2/2004 Baumann et al. ............ 297/391
7,070,205 B2 * 7/2006 Becker et al. ............... 280/751
7,108,320 B2 * 9/2006 Schafer et al. ......... 297/216.12
7,293,829 B2 * 11/2007 Thiel et al. ............. 297/216.12
2003/0057758 A1 * 3/2003 Baumann et al. ............ 297/391

* cited by examiner

*Primary Examiner*—Laurie K Cranmer
(74) *Attorney, Agent, or Firm*—McCarter & English, LLP

(57) ABSTRACT

The invention relates to a headrest of an automotive vehicle seat, said headrest comprising the following features: a carrier structure comprising at least one bar and being connected to a supporting member, said carrier structure being connected to said supporting member through at least one guide region and said supporting member being movable with respect to said carrier structure along a linear forward path of travel from a normal position of utilization into an accident position in which said supporting member is located both in the x direction and in the z direction in front of the position of utilization, a drive unit being provided, said drive unit comprising a tension spring and a blocking device, said blocking device comprising a first blocking part and a disengagement device, said first blocking part comprising an oblong opening through which engages a driver member of said carrier structure, in the position of utilization the tensile force of said tension spring abutting on said first blocking part and after the disengagement device has been actuated said first blocking part releasing said tension spring.

9 Claims, 4 Drawing Sheets

HEADREST WITH CARRIER STRUCTURE AND SUPPORTING MEMBER

CROSS-REFERENCE TO RELATED APPLICATIONS

This application claims priority to German Application No. DE102005014038.6, filed Mar. 23, 2005, the contents of which are expressly incorporated by reference in their entirety as part of the present disclosure.

BACKGROUND

The invention relates to a headrest of an automotive vehicle seat, said headrest having a carrier structure comprising at least one bar and a supporting member, the carrier structure being connected to the supporting member through at least one guide region and the supporting member being movable with respect to the carrier structure along a linear forward path of travel from a normal position of utilization into an accident position in which the supporting member is located both in the x direction and in the z direction in front of the position of utilization.

Such a headrest also has a known padding for the head of an occupant to rest against. Said padding is carried by the supporting member. The supporting member is substantially located behind and within the padding. The carrier structure connects the headrest to a backrest of a seat. Usually, the carrier structure has two parallel bars that are, most often slidably, disposed in the backrest.

In the event the automotive vehicle is involved in an accident, it is important that the occupant's head be sufficiently supported during the accident. Usually, the head of an occupant will not continuously rest on the padding; it is rather held at a certain distance from the padding. In the event of an accident, this is disadvantageous because the occupant's head will have to move a certain distance before coming to rest against the soft padding at all. It is well known that it is precisely the backward movement of the head relative to the upper body that causes pain and damage. This is known as "whiplash".

SUMMARY OF THE INVENTION

The present invention aims at designing a more comfortable headrest in the normal position of utilization as well, that is to make it adjustable in an adjustment direction lying in the x-z plane. The invention is particularly suited for active headrests which, during an accident, move in the x-direction and at the same time in the z-direction, for example 50 mm forward in the x-direction and 35 mm upward in the z-direction, after having been enabled by a crash sensor. For such type active headrests, helical springs such as tension springs are utilized inter alia as a drive. It is essential to make the comfort adjustment in the position of utilization aimed at independent of the force of such drive springs.

In view thereof, it is the object of the invention to develop a headrest, which is more specifically configured to be a crash-activated headrest preferably having a tension spring, in such a manner that comfort adjustment is possible in the position of utilization without the driving force of the spring affecting this adjustment.

This object is solved by the headrest having at least the features of claim 1. Such a headrest comprises a carrier structure including at least one bar and a supporting member, said carrier structure being connected to said supporting member through at least one guide region, and said supporting member being movable with respect to said carrier structure along a linear forward path of travel from a normal position of utilization into an accident position in which said supporting member is located both in the x direction and in the z direction in front of the position of utilization. The headrest further comprises a drive unit including a tension spring and a blocking device, the blocking device including a first blocking part and a disengagement device, the first blocking part including an oblong opening through which engages a driver member of said carrier structure, that in the position of utilization the tensile force of said tension spring abuts on said first blocking part and that after the disengagement device has been actuated said first blocking part releases said tension spring.

With this headrest, the particular arrangement of first blocking part and supporting member blocks the tensile force of the tension spring so as to render it inactive but for the actuation of the disengagement device. As a result, the action of the spring is not perceivable in the normal position of utilization. The adjustment within the normal position of utilization occurs along the same linear forward path of travel along which the headrest is caused to move in an accident position. However, it is preferred that the path allowed for comfort adjustment be shorter than the forward path of travel during an accident. The path of travel for comfort adjustment is a portion of the forward path of travel during an accident. In order to allow positioning the supporting member with respect to the carrier structure during comfort adjustment, different detent devices will be indicated and explained.

Together with further components, the first blocking part performs the task of blocking the tensile force of the tension spring until the disengagement device is released. Accordingly, the first blocking part neutralizes the tension spring. The tension spring is thereby supported within the subassembly consisting of drive unit and supporting member. Accordingly, the tension spring does not act directly between carrier structure and supporting member, and more specifically no longer directly onto the carrier structure, but rather onto the carrier structure via a drag coupling. Said drag coupling is formed by the long hole provided in the first blocking part and by the driver member of the carrier structure. Comfort adjustment of the supporting member and, as a result thereof, of the headrest, can occur within this long hole without this adjustment being biased by the tensile force of the spring. Depending on the comfort adjustment chosen in the position of utilization, the supporting member needs no longer be moved into the accident position along the entire linear forward path of travel but only along a portion of said linear forward path. In an accident situation, the drag coupling first moves along a possibly existing free path before the tension spring directly drives the supporting member relative to the carrier structure. At its one end, preferably at the lower end, the spring is secured to the supporting member.

In an embodiment, the first blocking part extends substantially in the direction of the tensile force of the tension spring and is supported and released in the event of an accident by the disengagement device in such a manner that the tension spring is allowed to shorten. The first blocking part is for example linked to the supporting body and is allowed to bend away when the disengagement device releases.

In another embodiment, the first blocking part and a second blocking part form a toggle lever pair. Said toggle lever pair is substantially in an extended position when the headrest is in the position of utilization. The disengagement device causes the toggle lever pair to bend, thus allowing the tension spring to shorten.

In another implementation, the first blocking part and the second blocking part are arranged like a toggle lever pair; they are not joined in their center by a common joint though but rather only by a common abutment surface. If, in the region of this abutment, the two blocking parts are pushed away or otherwise moved, the arrangement of the two blocking parts folds together, with the two blocking parts no longer abutting on one another, so that the tension spring comes free.

BRIEF DESCRIPTION OF THE DRAWINGS

Other features and advantages of the invention will become more apparent upon reviewing the other claims and the following non restrictive description of embodiments of the invention, given by way of example only with reference to the drawing. In said drawing:

DETAILED DESCRIPTION OF THE INVENTION

Figure 1:
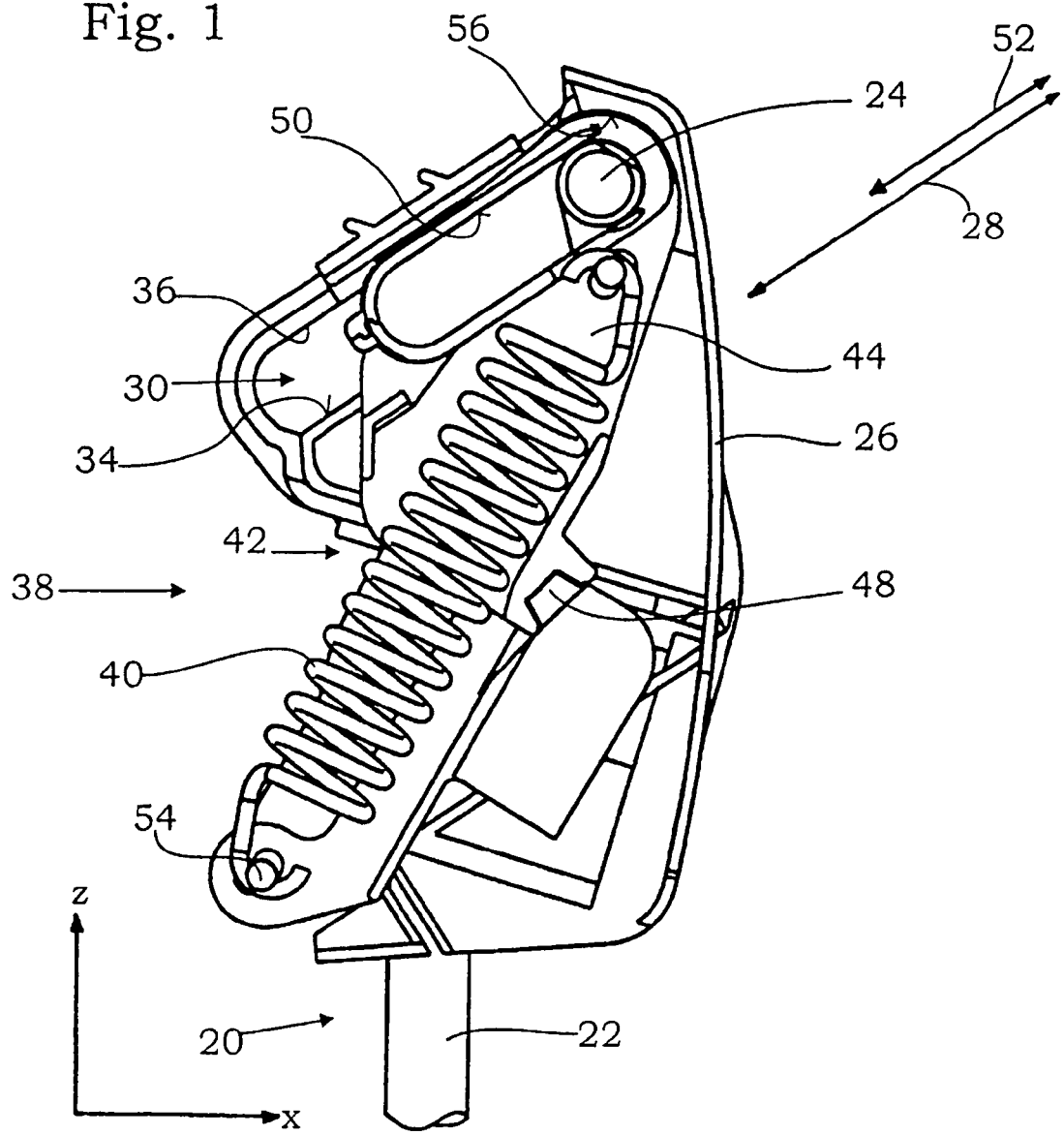
FIG. 1: is a schematic side view of a headrest, with the headrest being in the normal position of utilization and being located in its rearmost position in the x-direction and in the z-direction.
Figure 2:
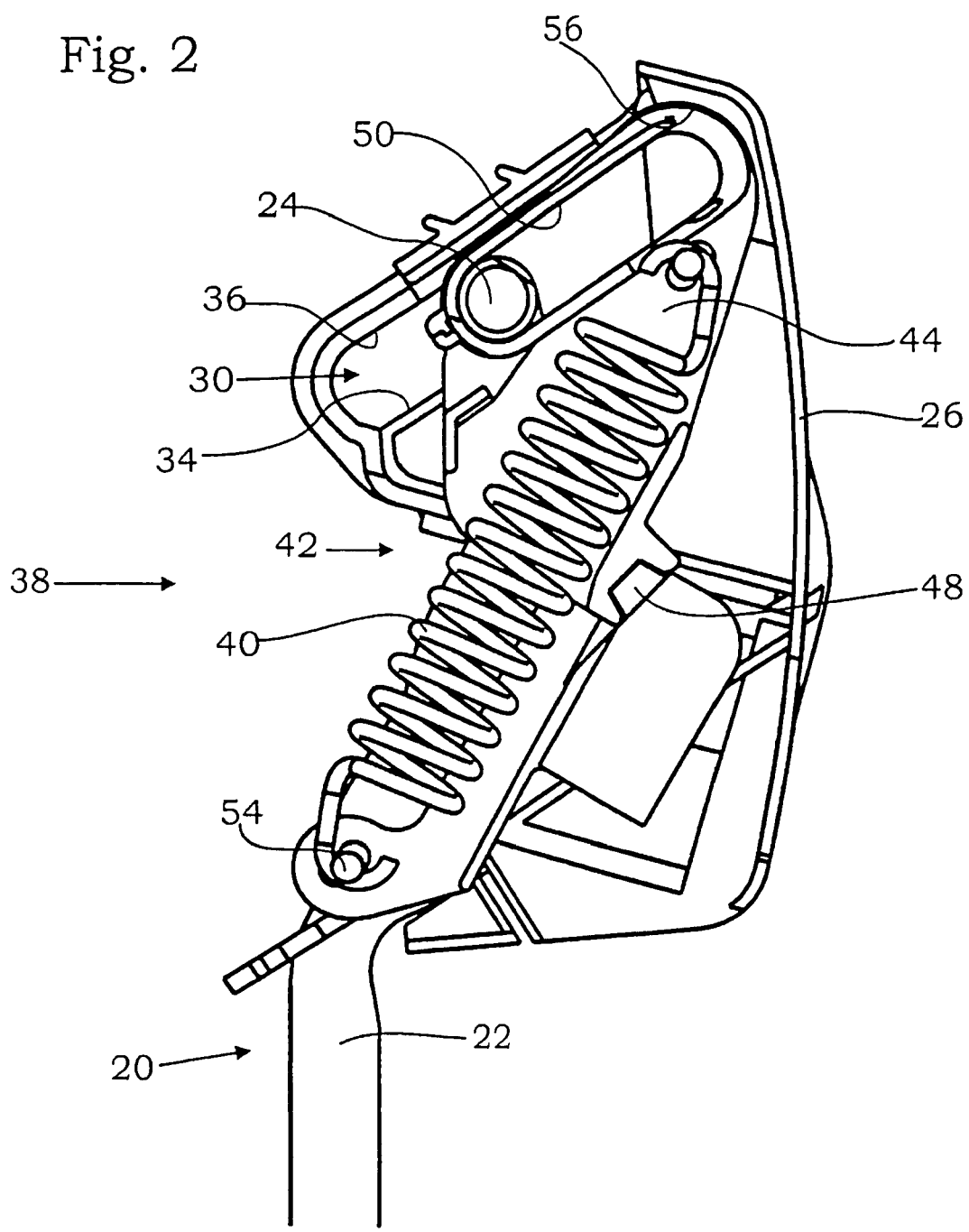
FIG. 2: is a view of the headrest like in FIG. 1, also in the position of utilization, only that the supporting member has now been moved forward a maximum within the comfort adjustment.

At first, the headrest will be explained in further detail with reference to the exemplary embodiment shown in the FIGS. 1 through 3. The explanations substantially also apply to the other exemplary embodiment shown in FIG. 4 so that this embodiment will only be described in detail insofar as it differs from the others.

As shown in the FIGS., the headrest has a carrier structure 20 that is formed by two parallel bars 22 in the present case. The two bars 22 are joined together through a tie piece 24 at the top so that they substantially form a generally U-shaped body; see FIG. 4. A supporting member 26 cooperates with said carrier structure 20, said supporting member substantially consisting of a plastic component. In principle, it may be made from any material. It can be moved from the position of utilization shown in the FIGS. 1 and 2 into the accident position shown in the FIGS. 2 and 4, this movement occurring along a linear forward path of travel 28. In the accident position, the supporting member is located both in the x direction and in the z direction in front of the position of utilization, starting from the position shown in FIG. 1 e.g., 50 mm in the x direction and 35 mm in the z direction, as can be seen from the FIGS.

The carrier structure 20 is connected to the supporting member 26 through two identically built upper guide regions 30 and through two lower guide regions 32 of identical construction although different from that of the upper guide regions. The upper guide regions are formed by the tie piece 24 and by an inclined guide member 34 formed by the supporting body 26. This inclined guide member 34 is part of a long hole 36 and forms the lower rim of said long hole 36. The tie piece 24 engages this long hole 36. Rather than the tie piece 24, another portion of the carrier structure, namely a driver member of the carrier structure, may be received in the long hole 36. As shown in the FIGS. 1 and 2, this tie piece 24 is located at the right upper end of the long hole 36 in FIG. 1, whereas in FIG. 3, it is located at the left lower end of said long hole 36. The free path of the tie piece 24 within the two upper long holes 36 determines the path the supporting body 26 is allowed to travel forward with respect to the carrier structure 20 in the upper guide regions 30, see double-headed arrow 28.

A drive unit 38 comprising a tension spring 40 and a blocking device 42 is provided. The blocking device 42 has a first blocking part 44, a second blocking part 46 cooperating therewith, and a disengagement device 48. The latter is connected to a crash sensor known per se (not shown) and disengages when said crash sensor responds. Disengagement of the disengagement device 48 can be seen comparing the FIGS. 1 and 2 on the one side and FIG. 3 on the other side.

The first blocking part 44 has an oblong opening 50 that also surrounds the tie piece 24. It forms a kind of drag coupling the function of which will be discussed herein after. As shown in the FIGS. 1 and 2, the longitudinal directions of the oblong opening 50 and of the long hole 36 are located one above the other and in the same direction. The tie piece 24 is allowed to move along an adjustment path 52, which is a portion of the linear forward path of travel 28. In FIG. 1, the two double-headed arrows 28 and 52 are disposed side by side and parallel to show them both. Actually however, they are superimposed.

The first blocking part 44 performs the task of blocking the tensile force of the tension spring 40 and of forming a drag coupling with respect to the carrier structure, namely with respect to the tie piece 24. In the concrete embodiment, the first blocking part 44 abuts on the second blocking part 46, with the abutment occurring in the region of the disengagement device 48. The second blocking part 46 is linked to the supporting member 26 about a pivot 54. The lower end of spring 40 is retained on the same pivot 54.

Figure 3:
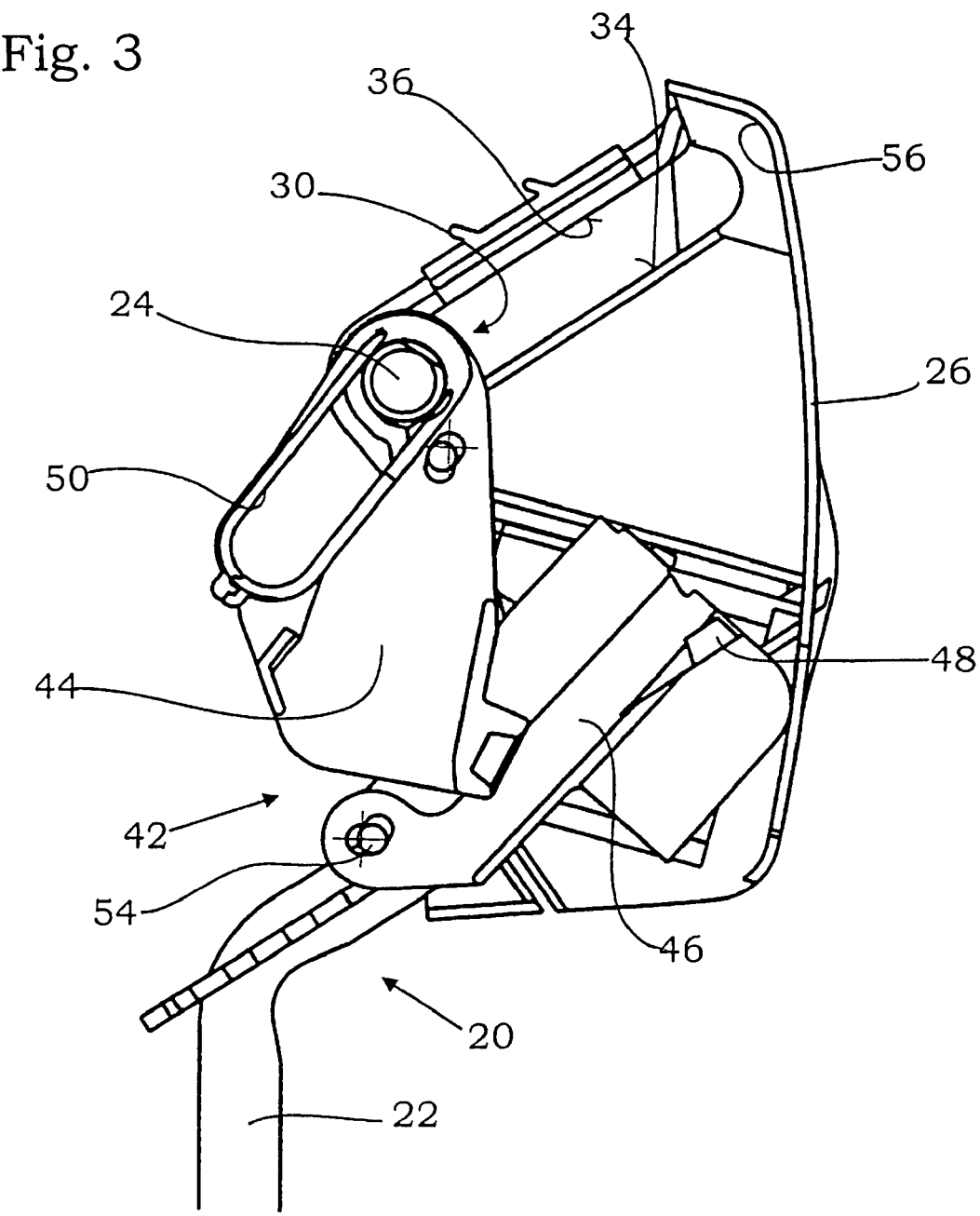
FIG. 3: is a view like in the previous FIGS., only that the headrest is now in the accident position.
Figure 4:
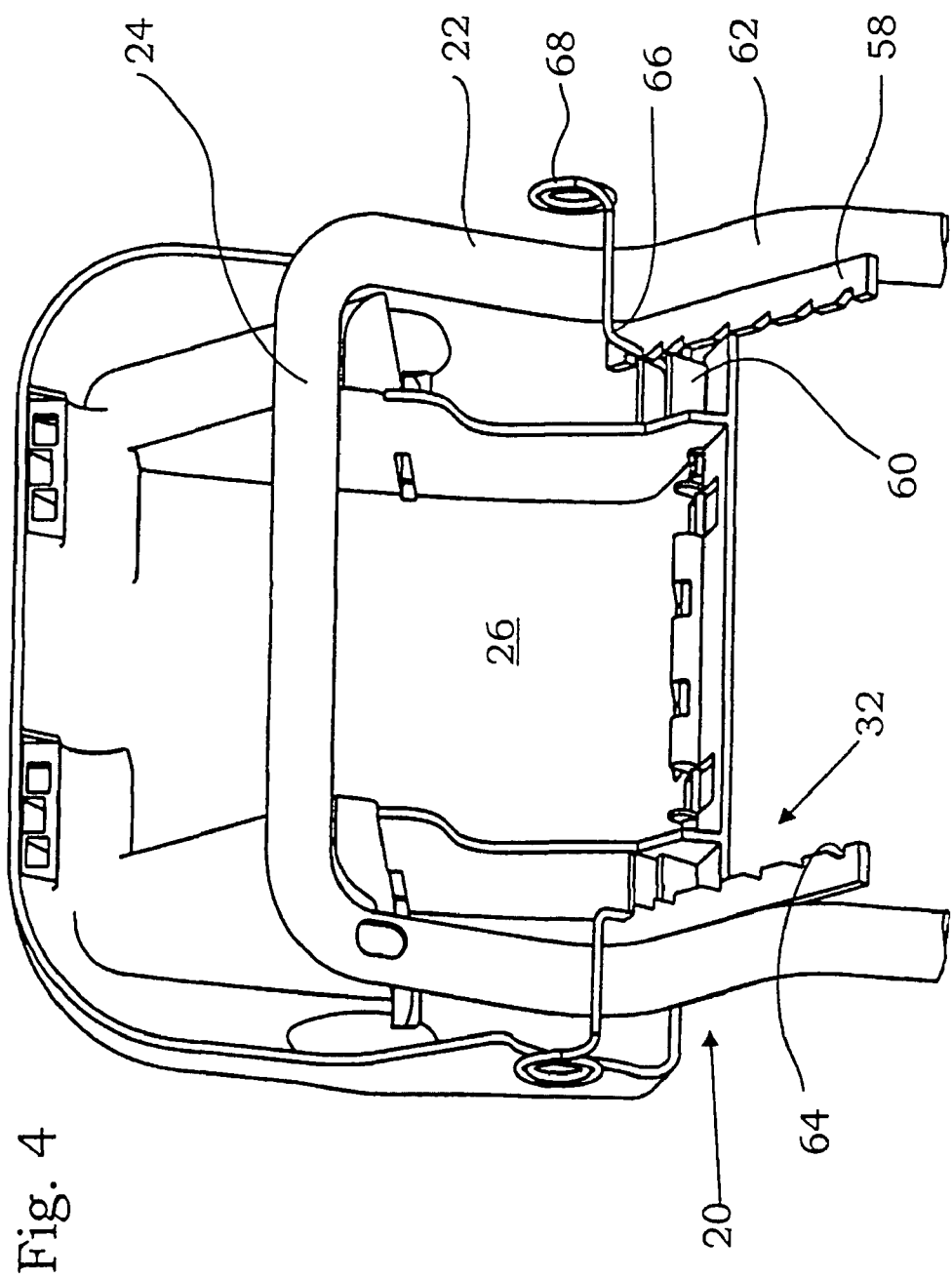
FIG. 4: is a perspective view of a headrest in a slightly different implementation from that in accordance with the FIGS. 1 through 3.

Upon actuation of the disengagement device 48, the two blocking parts 44, 46 leave their extended position and come into the position shown in FIG. 3. In this position, the tension spring 40 has come free and is no longer blocked by the blocking parts 44, 46. As a result, it pulls the supporting member upward so that the position shown in FIG. 3 is attained.

The first blocking part 44 fits against a V-shaped supporting surface 56 formed by the supporting member 26. As a result, it is prevented from swerving sideways. Its downward path of travel is limited by the second blocking part 46 and/or—depending on the embodiment—also by a possibly provided further blocking part 46.

In the accident position, the first blocking part 44 is substantially only attached to the tie piece 24. The blocking device can be reconstructed, although the headrest is then involved in reconstruction. If, by contrast, the two blocking parts 44, 46 are joined together by a common joint, meaning are configured to be a toggle lever arrangement, it is easier to restore the position of utilization.

The lower guide regions 32 are realized by guide profiles 58 and guide parts 60. The guide profiles 58 are configured to be flat sheet metal strips fastened to the inner side of the bars 22. Between the tie piece 24 and their lower end, the bars have an incline 62 that extends at the same angle as the guide profile 58, that is, parallel to the direction of the linear forward path of travel 52.

The guide profiles 58 have stop flanks 64. They are substantially serrated. The steep flank of a respective one of the saw teeth is located at the rear, meaning in the direction counter to the forward direction of travel. Stop lugs 66, which are fastened to the supporting member 26, cooperate with the stop flanks. They are formed by arms of a bent spring. At its free end, said spring has an actuation region 68. By pushing onto this actuation region, the stop lugs 66 are caused to come free from the respective stop flank 64. Then, the supporting member 26 can be manually moved back and forth within the adjustment path 52. The position of utilization is thereby maintained. This adjustment is referred to as comfort adjustment.

What is claimed is:

1. A headrest of an automotive vehicle seat comprising:
a carrier structure including at least one bar and a supporting member, said carrier structure being connected to said supporting member through at least one guide region, and said supporting member being movable with respect to said carrier structure along a linear forward path of travel from a normal position of utilization into an accident position in which said supporting member is located both in the x direction and in the z direction in front of the position of utilization; and
a drive unit comprising a tension spring and a blocking device, the blocking device blocking a movement of said tension spring in the position of utilization and including a first blocking part blocking in the position of utilization and a disengagement device, the first blocking part including an oblong opening through which engages a driver member of said carrier structure, said driver member being moveable relative to said supporting member, wherein in the position of utilization, said tension spring has a high tensile force and the tension spring acts on said first blocking part and, in the accident position, the tension spring has a low tensile force, the disengagement device is in an actuated state and said first blocking part does not hold back said tension spring.

2. The headrest as set forth in claim 1, wherein there is provided a second blocking part, that, in the position of utilization, the two blocking parts abut on one another and that said second blocking part abuts on the supporting member.

3. The headrest as set forth in claim 1, wherein the supporting member forms a V-shaped supporting surface for the first blocking part to fit against in the position of utilization.

4. The headrest as set forth in claim 1, wherein a long hole cooperating with the driver member of the carrier structure is formed in the supporting member.

5. The headrest as set forth in claim 1, wherein the driver member of the carrier structure is in the form of a tie piece.

6. The headrest as set forth in claim 1, wherein at least one lower guide region comprises a guide profile having stop flanks and that there is provided a stop lug for cooperation with said stop flanks.

7. The headrest as set forth in claim 1, wherein the driver member is moveable relative to said supporting member in the position of utilization.

8. A headrest of an automotive vehicle seat comprising:
a carrier structure including at least one bar and a supporting member, said carrier structure being connected to said supporting member through at least one guide region, and said supporting member being movable with respect to said carrier structure along a linear forward path of travel from a normal position of utilization into an accident position in which said supporting member is located both in the x direction and in the z direction in front of the position of utilization;
a drive unit comprising a tension spring and a blocking device, the blocking device including a first blocking part and a disengagement device, the first blocking part including an oblong opening through which engages a driver member of said carrier structure, that in the position of utilization the tensile force of said tension spring abuts on said first blocking part and that after the disengagement device has been actuated said first blocking part releases said tension spring; and
a second blocking part, wherein, in the position of utilization, the two blocking parts abut on one another and that said second blocking part abuts on the supporting member, and wherein the tension spring has a lower region and in its lower region, the tension spring abuts on a pivot and the second blocking part is pivotally connected to the supporting member about said pivot.

9. A headrest of an automotive vehicle seat comprising:
a carrier structure including at least one bar and a supporting member, said carrier structure being connected to said supporting member through at least one guide region, and said supporting member being movable with respect to said carrier structure along a linear forward path of travel from a normal position of utilization into an accident position in which said supporting member is located both in the x direction and in the z direction in front of the position of utilization;
a drive unit comprising a tension spring and a blocking device, the blocking device including a first blocking part and a disengagement device, the first blocking part including an oblong opening through which engages a driver member of said carrier structure, that in the position of utilization the tensile force of said tension spring abuts on said first blocking part and that after the disengagement device has been actuated said first blocking part releases said tension spring; and
a second blocking part, wherein, in the position of utilization, the two blocking parts abut on one another and that said second blocking part abuts on the supporting member and, in a lower region, the tension spring abuts on a pivot and the second blocking part is pivotally connected to the supporting member about said pivot.

* * * * *